United States Patent

[11] 3,580,069

[72] Inventors Raymond W. Warren
 McLean;
 Elmer L. Swartz, Annadale, Va.
[21] Appl. No. 831,526
[22] Filed June 9, 1969
[45] Patented May 25, 1971
[73] Assignee The United States of America as represented by the Secretary of the Army

[54] SUBSONIC FLUIDIC ANGLE-OF-ATTACK SENSOR
 11 Claims, 4 Drawing Figs.
[52] U.S. Cl. ............................................. 73/180
[51] Int. Cl. ........................................ G01c 21/00
[50] Field of Search ............................ 73/180, 212

[56] References Cited
 UNITED STATES PATENTS
2,008,885 7/1935 Upson ........................... 73/180
2,237,306 4/1941 Hood ............................ 73/180
3,327,529 6/1967 Bowles et al. ................. 73/180
2,858,698 11/1958 Hickey .......................... 73/212

Primary Examiner—S. Clement Swisher
Attorneys—Harry M. Saragovitz, Edward J. Kelly, Herbert Berl and J. D. Edgerton ABSTRACT: A fluidic angle-of-attack indicator for subsonic aircraft is disclosed. Two sensing tubes are located in that portion of the stagnation region of the wing of the aircraft where the flow separates and are used to control the output position of the power jet of a proportional fluid amplifier. As the angle of attack changes the rate of fluid entrainment from each of the sensing tubes changes and causes deflection of the power jet. The source of fluid for the power jet is derived from a ram tube located on the wing surface, with an air filter being positioned between the power jet and the open end of the ram tube. The readout consists of a piston-type float which is responsive to a fluid pressure differential on its opposing sides. A side-slip indicator, using the above arrangement, is provided by rotating the sensing tubes 90° and locating them in the stagnation region of the aircraft's vertical stabilizer.

The invention described herein may be manufactured, used, and licensed by or for the United States Government for governmental purposes without the payment to us of any royalty thereon.

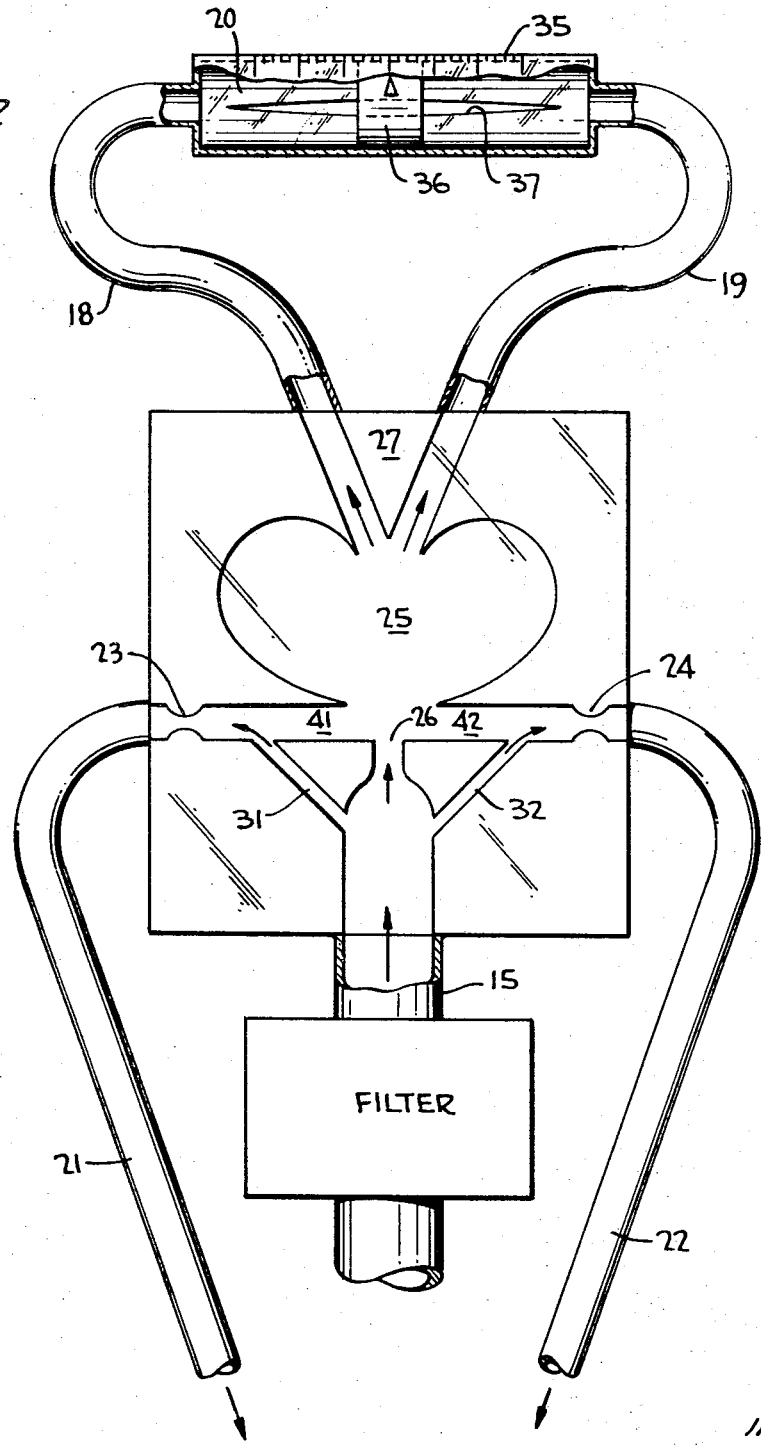

SUBSONIC FLUIDIC ANGLE-OF-ATTACK SENSOR

BACKGROUND OF THE INVENTION

This invention relates to subsonic aircraft instrumentation, and more particularly to a device for producing an output which is an indication of the angle-of-attack of a subsonic aircraft.

The angle of attack is that angle formed by the intersection of the cord line of the wing with the direction of the wind. Accurate knowledge of the angle-of-attack gives the pilot information with regard to the aircraft's rate of climb, maximum glide range, and longitudinal stability. This knowledge facilitates precision flying under conditions of rapidly changing temperature, density, and gross weight. While calculations can be made prior to takeoff, which, with the aid of an air speed indicator, can be of some help to the pilot, it is often necessary to have a means which automatically takes into account all variables and produces an instantaneous output reading.

In addition to determining the angle-of-attack, it is desirable for the pilot to know the angle of slip of the aircraft. This angle is formed by the intersection of a line parallel to the span of the wings and the direction of the wind. For such a determination a side-slip indicator is often used.

It has been heretofore proposed to employ a vane mounted on the aircraft for free-swinging motion in the air stream. This expedient has several objections, including the fact that it is cumbersome and fragile. Another technique employs spaced-apart apertures in the skin of the aircraft, but this requires association with pressure-responsive transducers having mechanically moving parts mounted within the vehicle. Such a system suffers from the inherent disadvantages that mechanically moving parts are fragile, inefficient, and subject to wear. One prior system proposed the use of an all-fluid measuring device, but this system is inefficient because it relies upon an independent, mechanically operated power fluid source. Also, this system depends upon measuring pressure differential between two opposed points on the aircraft. Since the pressure differential is often rather small, it is difficult to achieve the kind of accuracy and reliability that is required for precision flying.

It is therefore a primary object of this invention to provide a fluidic angle-of-attack sensor which has no mechanically moving parts.

A further object of this invention is to provide a fluidic angle-of-attack sensor which does not require an independent, mechanically operated fluid source.

Still a further object of this invention is to provide a fluidic angle of attack sensor which is inherently accurate and efficient, and does not suffer from any of the disadvantages of the prior art.

It is also an object of this invention to provide a side-slip indicator employing the same principles employed in the angle-of-attack indicator.

SUMMARY OF THE INVENTION

Briefly, in accordance with this invention, a fluid amplifier is used to accurately measure the angle-of-attack. The power jet of the fluid amplifier is supplied with air from a ram tube which is located at some convenient point on the surface of the aircraft and which is subjected to high velocity air at its intake. The air taken in by the ram tube is passed through an air filter to prevent dust and particles from entering the fluid amplifier. The two control tubes of the fluid amplifier are fluid-coupled to a sensor which is located ahead of the wing where the sensor is subject to the amplified change of angle of flow when the angle-of-attack changes. Flow is entrained from the sensor at a rate dependent upon the angle-of-attack. Entrainment at the control tubes controls the fluid amplifier which in turn controls the position of a small float on an indicator.

BRIEF DESCRIPTION OF THE DRAWINGS

The specific nature of the invention as well as other objects, aspects, uses, and advantages thereof will clearly appear from the following description and from the accompanying drawing, in which:

FIG. 2 is a detailed view of the fluid amplifier and read-out of the embodiment in FIG. 1.

DESCRIPTION OF THE PREFERRED EMBODIMENT

Figure 1:
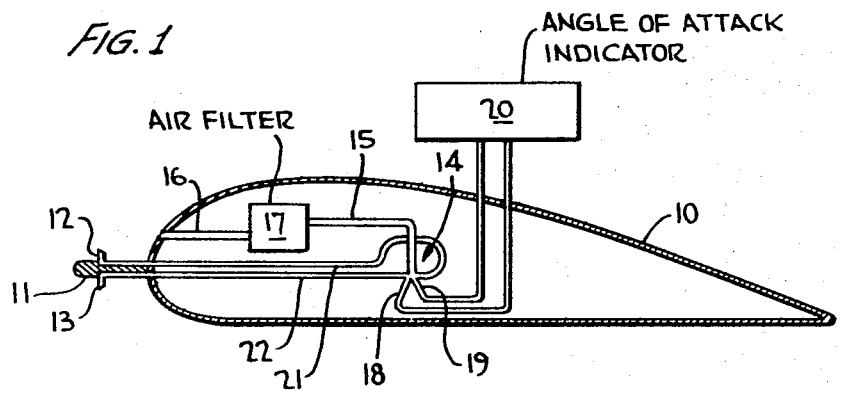
FIG. 1 is a cutaway view of an embodiment of the invention.

Referring now to FIG. 1, the wing 10 of a subsonic aircraft has been modified with the addition of a protruding section 11 capable of supporting the output tubes of the fluid angle-of-attack sensor. The sensing portion of the sensor consists of two tubes 12 and 13, which are located in the stagnation region slightly ahead of the wing and which provide fluid to control tubes 21 and 22 of fluid amplifier 14. Fluid amplifier 14 receives power fluid from input passage 15 which receives fluid through ram tube 16 open to atmosphere. The input power fluid derived from ram tube 16 is filtered through air filter 17 prior to entering the fluid amplifier. Output passages 18 and 19 of fluid amplifier 14 are fluid-coupled to the angle-of-attack indicator 20. Control of fluid flow between output passages 18 and 19 is provided by means of left control channel 21 which is fluid-coupled to upper sensor 12, and right control channel 22 which is fluid-coupled to lower sensor 13.

FIG. 2 shows a more detailed description of the fluid amplifier and angle-of-attack indicator shown in FIG. 1. Power fluid from input passage 15 communicates with interaction chamber 25 of amplifier 14 by means of inlet nozzle 26. Fluid entering interaction chamber 25 is diverted by means of divider 27 into either left output channel 18 or right output channel 19. Inlet tube 15 also communicates with left control channel 21 by means of left bias channel 31, and with right control channel 22 by means of right bias channel 32. Fluid restrictors 23 and 24 provide resistance to fluid flow in control channels 21 and 22, respectively. Read-out 20 is shown as a horizontal tube 35 with a loose-fitting foam plastic piston 36. The fluid output of amplifier 14 enter the opposite ends of cylinder 35, causing piston 36 to move to a position in the cylinder which is dependent upon the relative pressure on the opposing sides of the piston.

In the operation of the system, fluid is supplied to passage 15 by means of ram tube 16 after having passed through air filter 17. The main portion of fluid in passage 15 is directed to nozzle 26 and divides between outlet passage 18 and 19 after passing through interaction chamber 25. One portion of the fluid in passage 15 is diverted to left bias channel 31 and another portion to right bias channel 32, producing flow in the left control channel 21 and right control channel 22 substantially as indicated by arrows in FIG. 2. With a zero angle-of-attack, flow in control channels 21 and 22 will be equal and power fluid issuing from power nozzle 15 will divide equally between output channels 18 and 19. Under zero angle-of-attack conditions, air will flow past upper sensor 12 and lower sensor 13 at substantially the same velocity and will, therefore, entrain fluid from both sensors at the same rate. As the angle-of-attack changes, the amount of air which is entrained from one sensor will increase while the air entrained from the opposite sensor will decrease. As a result, more fluid will flow in one or the other of control channels 21 and 22, thereby producing a control signal which is applied to power nozzle 26. This control signal will cause fluid in interaction chamber 25 to deflect to one or the other of output channels 18 and 19.

Figure 3:
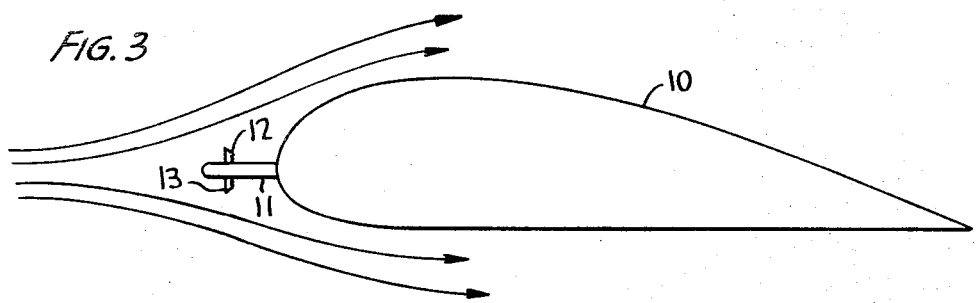
FIG. 3 shows an embodiment of the invention operating under zero angle-of-attack.
Figure 4:
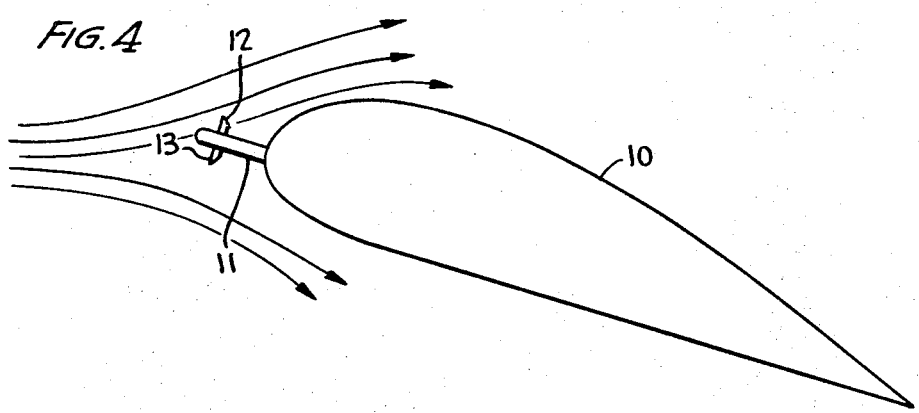
FIG. 4 shows an embodiment of the invention operating under an angle-of-attack greater than zero.

This phenomenon can best be understood with reference to FIGS. 3 and 4. FIG. 3 shows wing section 10 having a support rod 11 connected thereto. Sensors 12 and 13 are located on opposing sides of support rod 11. As shown in this FIG., the system is operating at a zero angle-of-attack. Under this operating condition, fluid divides equally between the upper and lower portion of support member 11 and entrains fluid from both sensors 12 and 13 at the same rate. In FIG. 4 the system is shown operating at an angle-of-attack greater than zero. Under this operating condition, air will no longer divide equally between the upper and lower sensors. Air which travels the lower path will oppose fluid issuing from lower sensor 13, while air traveling the upper path will entrain fluid issuing from sensor 12. As a result, more fluid will issue from sensor 12 than from sensor 13. Since sensor 12 is fluid-coupled to left control channel 21, entrainment in sensor 12 will cause increased fluid flow in bias channel 31 and a corresponding decrease in flow in bias channel 32. This increased flow of fluid in left bias channel 31 will produce a low pressure region 41 immediately to the left of power nozzle 26, with the result that region 42 immediately to the right of power nozzle 26 will be at a higher pressure than region 41. Fluid issuing from power nozzle 26 will, therefore, be partially deflected toward left output channel 18, while only a smaller amount of fluid will enter right output channel 19. This will produce a pressure differential on the opposing sides of piston 36 and will cause piston 36 to locate itself somewhere to the right of center, thereby indicating to the pilot the exact angle of attack.

The system is designed with the aid of resistors 23 and 24 to control the amount of flow out of sensors 12 and 13, thereby enabling the amplifier 14 to always measure a difference due to entrainment in control channels 21 and 22. Because the power jet of fluid amplifier 14 has a common supply of filtered ram air to nozzle 26 and bias channels 31 and 32, a proportional relationship between the strength of the power jet and strength of the controls is always assured.

A side-slip indicator may be provided by simply rotating sensing elements 12 and 13 by 90° and conveniently locating the sensors at a point just forward of the vertical stabilizer where there is a stagnation region which would cause an amplified change of flow in the desired orientation. The side-slip indicator would be provided with a fluid system indentical to that shown for the angle-of-attack indicator, and the pilot could employ both indicators simultaneously.

The transmission of the signal from the sensor to the indicator is at the speed of sound. Thus, for distances between the sensors and the indicator up to 100 feet, the response of the indicator would be an order of magnitude faster than the pilot's response time.

Indicator 20 is but one example of a fluid indicator which may be used. The nonlinearity in the gain of the system can be compensated for by providing cylinder 35 with a tapered slot 37, or by placing a number of unequally distributed holes in the cylinder. Instead of using an indicator as shown, the angle-of-attack signal can be applied directly to the input of a fluidic autopilot to control the aircraft. The signal may be amplified through several stages, each stage of amplification adding less than a millisecond of response time. Flow gains of $10^5$ can readily be obtained in 5 stages, thereby providing ample power output to accomplish control functions.

The sensors are located in the stagnation region just ahead of the front edge of the wing where the flow separates between the upper and lower portion of the wing. In the stagnation region an amplified change of direction is sensed by the sensing tubes 12 and 13. For example, a change in wind angle of approximately 16° would produce a flow change at the sensors of approximately 60°. This amplification effect is nonlinear, being greatest at 0° angle-of-attack and decreasing with increasing angle-of-attack. At an angle-of-attack of about 6°, which corresponds to a normal glide and climb angle, an amplification of about 4 would be experienced.

The precise location of the angle-of-attack sensor would depend upon the stagnation region for each particular type of wing. This would have to be determined for each type of wing prior to installation of the sensor.

We wish it to be understood that we do not desire to be limited to the exact details of construction shown and described, for obvious modifications will occur to a person skilled in the art.

We claim:

1. An angle-of-attack and side-slip indicator for subsonic aircraft comprising:
   a. a fluid amplifier having a power nozzle, and interaction chamber, first and second control channels and an output;
   b. a ram tube having its open end located at the surface of said aircraft to supply ram fluid to said power nozzle;
   c. first and second sensing tubes located just ahead of the front edge of the aircraft in that portion of the stagnation region of the aircraft where the flow separates, said sensing tubes being in fluid communication with said first and second control channels respectively; and
   d. a read-out means connected to the output of said fluid amplifier.

2. The device of claim 1 wherein said sensing tubes are located forward of the aircraft wing for sensing an amplified signal indicative of the angle-of-attack.

3. The device of claim 1 wherein said sensing tubes are located forward of the vertical stabilizer for sensing an amplified signal indicative of side-slip.

4. The device of claim 2 further comprising first and second bias channels for providing a fluid flow path between said ram tube and said first and second control channels of said fluid amplifier so as to bypass said interaction chamber.

5. The device of claim 3 further comprising first and second bias channels for providing a fluid flow path between said ram tube and said first and second control channels of said fluid amplifier so as to bypass said interaction chamber.

6. The device of claim 5 further comprising first and second resistor means located in each of said first and second control channels.

7. The device of claim 4 further comprising first and second resistor means located in each of said first and second control channels.

8. The device of claim 7 wherein said read-out means comprises a piston-type float located within a hollow cylinder and means to compensate for nonlinearity in the gain of the system.

9. The device of claim 6 wherein said read-out means comprises a piston-type float located within a hollow cylinder and means to compensate for nonlinearity in the gain of the system.

10. The device of claim 8 wherein said means to compensate comprises a tapered slot in said cylinder.

11. The device of claim 9 wherein said means to compensate comprises a tapered slot in said cylinder.